April 29, 1958 — J. L. BEEBE — 2,832,500
EGG WASHING AND CARRYING BASKET
Filed Sept. 17, 1954 — 2 Sheets-Sheet 1

INVENTOR
JOSEPH L. BEEBE
BY
*Parker & Carter*
ATTORNEYS

April 29, 1958  J. L. BEEBE  2,832,500
EGG WASHING AND CARRYING BASKET
Filed Sept. 17, 1954  2 Sheets-Sheet 2

INVENTOR
JOSEPH L. BEEBE

BY *Parker & Carter*
ATTORNEYS

United States Patent Office 2,832,500
Patented Apr. 29, 1958

2,832,500
EGG WASHING AND CARRYING BASKET
Joseph L. Beebe, Cissna Park, Ill.

Application September 17, 1954, Serial No. 456,764

1 Claim. (Cl. 220—19)

This invention relates to a novel attachment to the class of receptacles particularly those known as wire egg baskets or pails.

I am well aware that wire egg baskets or pails to which this invention pertains are well developed by the existence of numerous types possessing corresponding features and advantages. But notwithstanding the admittedly active nature of the art to which this invention pertains, I have nevertheless succeeded in devising for use an attachment in this category which it is believed is a novel contribution to this line of endeavor, and offers readily recognizable refinements and improvements.

The preferred embodiment of the invention is characterized by a wire constructed conical-shaped projection extending upward from the center of the bottom of the circular wire egg basket or pail to a height of approximately two-thirds of the height of the basket.

Novelty is further predicated upon the composition of the wire cone, being constructed of wires, which wires are projections or continuations of the wires which compose the outer body and bottom of the basket proper.

Farmers, poultry-men, egg graders, and others engaged in production and handling of the fragile and delicate commodity known as eggs must by necessity limit their handling and movement of such commodity by its frail and perishable nature, which is to say, the more often the eggs are moved, washed, handled or otherwise manipulated the greater and more costly the breakage hazard. In addition thoroughly cleansed eggs command a more ready market than those partially defiled with dirt and grime. To thus meet the exigencies of the industry, the need is apparent for an egg container so constructed as to afford maximum protection against breakage and to allow a thorough cleansing operation.

The principal object of the invention therefore is to provide a wire egg basket with a conical protrusion into the center of the bulk of eggs contained therein so as to permit water or cleansing solution to be projected rapidly over a greater surface of eggs particularly the underside or bottom of the bulk of eggs, likewise limiting the distance through which the fluid must permeate, and by means of a flat horizontal cap at the top of the cone to deflect cleansing fluid laterally into the eggs when said fluid is forced into the conical projection.

Another object of the invention is to provide an opening whereby a brush may be used in conjunction with the cleansing solution, as a cleansing-cleaning medium to reach a greater surface of the enclosed contents.

Another object of the present invention is to provide a more expeditious drain of foreign matter and particles of dirt during the washing process by reason of the more extensive exposure of under surface and less compactness in the bulk of contents.

Another object of the instant invention is to provide an egg basket which by reason of the vacant conical volume provides less density and therefore permits a freer circulation of air, thus facilitating a more rapid drying operation after cleansing and permitting a faster and more even cooling of the entire mass of eggs and likewise permitting the free passage of air to contents when stored or awaiting crating, eliminating damp, warm pockets in the bulk of eggs.

Still another object of the invention is that the wire cone will provide a rigid center support to retain the fragile eggs in a stationary alignment, eliminating the usual hazardous rolling and shifting when the basket is carried or moved about.

Still another object of the invention is to provide a wire egg basket which because of the center cone construction of continuous wires will retain its original form when filled with eggs by reason of having the weight of the contents distributed laterally rather than entirely downward.

Other features and advantages of the invention will become more readily apparent from the following description and the accompanying illustrative drawing, forming a part of this specification, with the understanding however, that the invention is not confined to any strict conformity with the showing of the drawing but may be changed or modified so long as such changes or modifications mark no material departure from the salient features of the invention as expressed in the appended claim.

Figure 1:
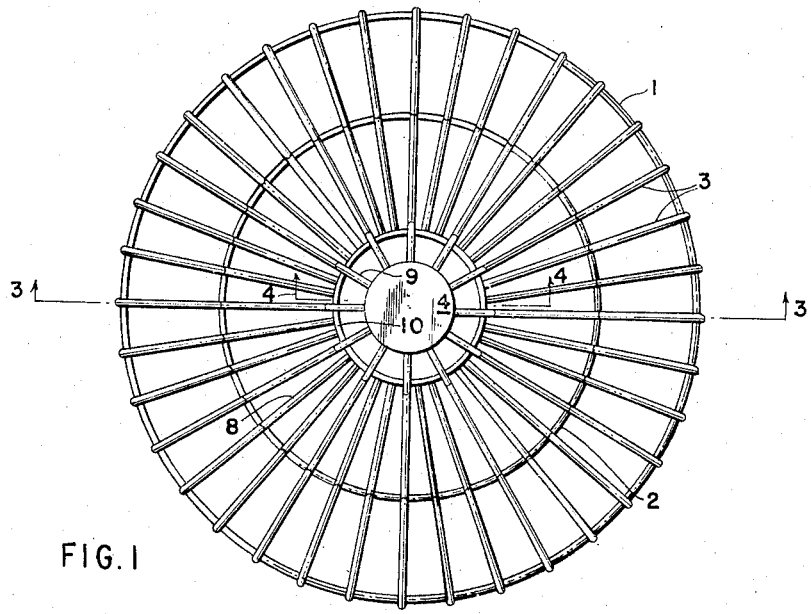
Figure 1 is a top view of the wire basket with conical projection.

Referring now more particularly to the drawing wherein like numerals of reference indicate corresponding parts throughout the several views the numeral 3 indicates generally the wires of the side wall of the receptacle (wire however may be supplanted by other material as hereinafter provided) while the bottom wires of the receptacle as indicated by numeral 8, are composed of horizontal wires which are continuations of the wall wires 3, such continuations being pictured graphically in Figure 1 where it is seen that they continue inwards towards the center of the basket.

Numeral 9 indicates the wires composing the body of the cone, which wires are continuations of certain of the wires 8 comprising the bottom of the basket.

The top ends of the wires 3 of the body of the basket are fitted to a steel wire hoop 1, which encircles the top ends of the wires 3, the said top ends being bent or rolled outward, over, and under the hoop 1, so as to firmly hold the same. However in lieu of connecting the wire ends to the hoop 1 by bending, any other suitable method such as welding may be employed to make the ends fast to the hoop.

As shown, hoop 1 is formed with inverted U-shaped ears at diametrically opposite sides of the hoop, which ears extend upwards to accommodate the ends of bail 6, which are pivotally engaged therewith.

As shown hoop 1 has a greater diameter than hoop 2, to which the lower end of the supporting side wires are fastened, preferably by welding, but any other suitable means may be employed. Hoop 2 is composed of the same gauge wire as hoop 1 and is formed with four U-shaped indentations or ears which project downwards to be used as legs when hoop 2 is attached to the basket bottom. Each of these four U-shaped legs is situated a distance one-fourth the circumference of the hoop 2 from the adjacent legs.

Figure 2:
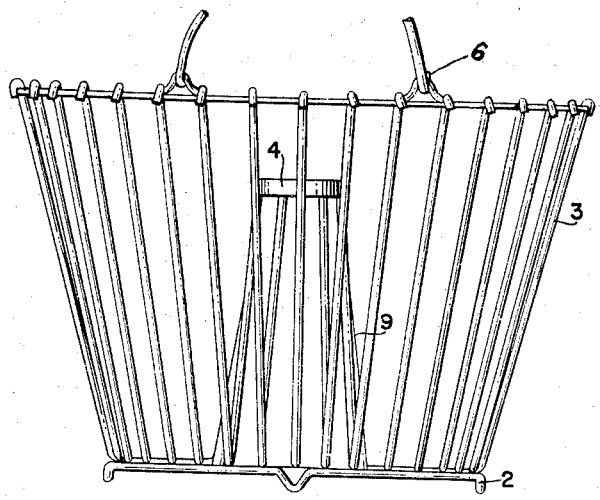
Figure 2 is a view in side elevation of the wire egg basket showing side elevation of center conical projection.
Figure 3:
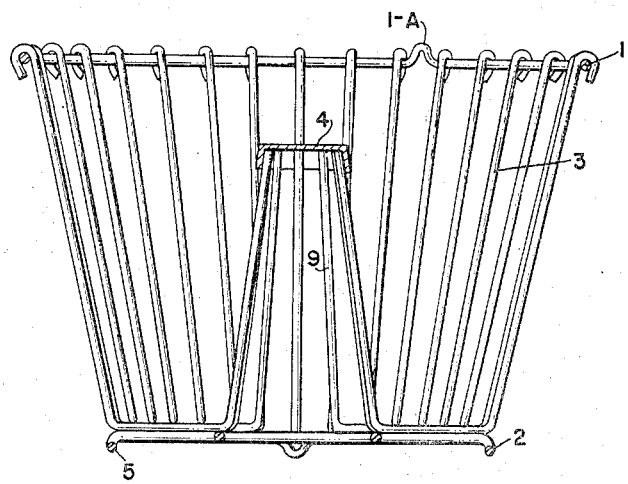
Figure 3 is a sectional view taken substantially upon line 3—3 of Figure 1.

The inner ends of certain of the horizontal wires 8 forming the bottom are continued upward from the bottom at an obtuse angle from reinforcing hoop 10 to form a conical projection 9 in the center of the basket. Those horizontal wires not continued upwards to form the cone are fastened at their inner ends to hoop 10 by welding or other suitable means. The wires 9 continue upwardly to a height not higher than the height of the basket (Figures 2 and 3) and are received at this top point in the outer edge of a disc-like metal cap 4, which provides a coupling for the upper ends of the wires holding them firmly in assembled relation, said cap being attached to them by welding or similar suitable process. Cap 4 being composed of steel has an outer circumferential lip extending downward surrounding and over the ends of the wires.

The bottom horizontal wires 8 which are projected upward to form cone 9 are fastened to hoop 10 at the angle of departure from the horizontal either by welding or other suitable means.

As above conditioned wherever wire is used in the invention it may be supplanted with an alternative material, particularly flat steel stripping except wherein steel hoops are called for. Wires or steel strips forming the sides and cone of the improved basket herein in each case are spaced equidistant from their neighbor at any horizontal cross section.

The entire receptacle can be coated with a resilient plastic, rubber, or other equivalent material.

Figure 4:
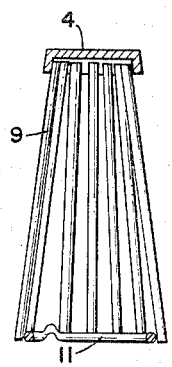
Figure 4 is a sectional view of cone adapter taken substantially upon line 4—4 of Figure 1.

Figure 4 depicts another modification of my device, containing the same descriptions above except that the bottom ends of the side wires 9 terminate at hoop 11, being attached thereto by welding preferably but any equivalent process may be employed. Such cone-adapter may be attached by suitable means to any circular wire egg basket now on the market or in use so as to provide a basket of the general class with many of the advantages and uses referred to above.

Minor changes in shape, size, materials, and arrangement may be resorted to in actual practice so long as no departure is made from the invention as claimed.

Having thus described the invention, what I claim and desire to secure by Letters Patent is:

An egg washing and carrying basket comprising a hoop, a generally frusto conical wall formed of a plurality of downwardly, inwardly inclined wires having their upper ends secured to said hoop and circumferentially spaced thereon, a bottom wall formed of continuing portions of said circumferentially spaced wires, said continuing portions lying entirely within the same horizontal plane and being inwardly radially directed toward the axis of said basket, some of said inwardly directed wire portions terminating at points outwardly spaced from said axis, the remainder of said inwardly directed wire portions being upwardly bent at an obtuse angle from the horizontal, said upwardly bent wire portions being circumferentially spaced in relation one to another and forming together a generally frusto conical center basket section, the upper ends of said upwardly bent wire portions terminating below said hoop and above the mid-point of said first named frusto conical wall, a fluid deflecting cup-like member comprising a solid metal disk having a depending circumferential flange portion surrounding and secured to said upper ends of said last named wire portions at circumferentially spaced points on said flange, a reinforcing ring secured to said upwardly bent portions at the point at which they are upwardly bent and secured also to the terminal ends of the other inwardly radially directed wire portions, a second reinforcing ring of larger diameter than said first named reinforcing ring and secured to the bottom surface of said bottom wall, said last named ring having circumferentially spaced, downwardly offset portions forming legs for said basket, and a bail secured to said hoop for movement thereon through an arc of substantially 180°.

References Cited in the file of this patent
UNITED STATES PATENTS

| | | |
|---|---|---|
| 646,128 | Price | Mar. 28, 1900 |
| 909,715 | Troegeler | Jan. 12, 1909 |
| 920,312 | Fox | May 4, 1909 |
| 2,121,403 | Lapinskas | June 21, 1938 |

FOREIGN PATENTS

| | | |
|---|---|---|
| 608,626 | Great Britain | Sept. 17, 1948 |